United States Patent [19]
Thienpont

[11] Patent Number: 5,500,238
[45] Date of Patent: Mar. 19, 1996

[54] METHOD AND DEVICES FOR PROCESSING FRESH FOODSTUFFS

[76] Inventor: Bernard Thienpont, Edelareberg 19, B-9700 Oudenaarde; Belgique, Belgium

[21] Appl. No.: 256,840
[22] PCT Filed: Jan. 19, 1993
[86] PCT No.: PCT/BE93/00003
§ 371 Date: Jul. 28, 1994
§ 102(e) Date: Jul. 28, 1994
[87] PCT Pub. No.: WO93/14651
PCT Pub. Date: Aug. 5, 1993

[30] Foreign Application Priority Data

Jan. 31, 1992 [BE] Belgium ................................. 9200108

[51] Int. Cl.$^6$ ................................. A23B 7/00; A23L 3/00
[52] U.S. Cl. ................................. 426/511; 99/471; 99/472; 99/473; 99/483; 426/520
[58] Field of Search ................................. 426/510, 511, 426/520; 99/471, 472, 473, 483

[56] References Cited

U.S. PATENT DOCUMENTS

| | | | |
|---|---|---|---|
| 3,754,466 | 8/1973 | Taralli et al. | 99/472 |
| 3,759,166 | 9/1973 | Trandin et al. | 99/472 |
| 4,967,651 | 11/1990 | Hsieh et al. | 99/472 |

Primary Examiner—George Yeung
Attorney, Agent, or Firm—Robert D. Varitz

[57] ABSTRACT

The present invention relates to a method for processing fresh foodstuffs in large quantities and in bulk, such as fruit and vegetables but also other types of foodstuffs such as pasta, fish, meat, etc. in order to allow them to be preserved for a long period of time whilst keeping their organoleptic characteristics. The invention also extends to devices for implementing this method.

14 Claims, 4 Drawing Sheets

METHOD AND DEVICES FOR PROCESSING FRESH FOODSTUFFS

SUBJECT OF THE INVENTION

The present invention relates to a method for processing fresh foodstuffs in large quantities and in bulk, such as fruit and vegetables but also other types of foodstuffs such as pasta, fish, meat, etc. in order to allow them to be preserved for a long period of time whilst keeping their organoleptic characteristics. The invention also extends to devices for implementing this method.

TECHNOLOGICAL BACKGROUND

The normal techniques of preservation by pasteurization or sterilization aim to make products preservable for a long period of time whilst trying to keep their taste and their appearance.

The main difficulty resides in the fact that the products are normally heated by direct contact, that is to say by conduction or by convection and most often at high temperatures and for long periods of time, which makes the product lose some of its organoleptic and physico-chemical properties.

By way of example, let us consider the particular case of techniques for preserving fruit. For most known techniques relating to the preservation of fruit, the heat treatment of the pieces of fruit produces a purée or stewed fruit which is not suitable for most current industrial or household uses, in particular for cake making.

Various methods for preserving or cooking foodstuffs, which attempt to remedy this problem are known in the state of the art.

In particular, document FR-A-2,635,167 describes an apparatus for steam treatment of products in a pressurized or vacuum chamber. Although the products are apparently treated in bulk, it seems to be necessary to arrange them, for example, on trays or trolleys in order to carry out the processing in the apparatus.

Furthermore, this processing can in no way be carried out continuously or semicontinuously. In fact, the apparatus has to be stopped in order to introduce the foodstuffs into the pressurized or vacuum chamber.

Document EP-A-0,006,369 describes a method for continuous heat treatment of unpackaged or packaged bulk products in a casing in which a vacuum is set up; this vacuum is then broken by an external supply of steam. This step has the consequence of pressurizing the casing.

Document CA-A-975,976 describes a method for cooking foodstuffs according to which water is heated to boiling in an enclosed container, and air and some of the steam created in this container are expelled so as to obtain a partial vacuum therein, the cooking is carried out under partial vacuum and this partial vacuum is terminated before removing the foodstuffs from the container. This method which is described obviously does not allow continuous or semicontinuous treatment. Again, the machine should be completely stopped before extracting the foodstuffs.

Document U.S. Pat. No. 4,543,283 describes an apparatus and a method which are intended for heating and cooling foodstuffs continuously, in which the steam treatment container is under pressure.

OBJECTS OF THE INVENTION

The invention aims to provide a method for preservation of fresh foodstuffs which avoids the drawbacks of solutions of the state of the art and more particularly aims to develop a processing method which provides better guarantees of preserving the organoleptic and physico-chemical characteristics of the treated product.

In particular, it is desired to obtain a method which operates continuously or semicontinuously and which allows the foodstuffs treated to be packaged directly on leaving the treatment device.

The method according to the invention is more precisely intended for what is termed "aseptic filler" or "hot filler" techniques, which may be expressed in French as techniques of aseptic filling or self-pasteurization, without cooling.

The invention also relates to devices (installations) for implementing the said method.

MAIN CHARACTERISTIC ELEMENTS OF THE INVENTION

The present invention relates to a method for preservation of bulk fresh foodstuffs by heat treatment, characterized in that the foodstuffs are introduced into a reduced-pressure chamber and in that these foodstuffs are subjected to a flow of steam in a direction opposite to that of their movement, this steam condensing on the foodstuffs and being generated from water released from the foodstuffs and optionally from the added covering liquid which is necessary for aseptic filling.

According to the present invention, the heat can in this way be transmitted to the product in its bulk, that is to say without needing to agitate or manipulate the product and therefore without it becoming damaged.

The processing of foodstuffs according to the present invention can be carried out with a semicontinuous continuous method, and also with a continuous method, advantageously in a very short space of time of the order of 5 to 6 minutes.

Furthermore, the method according to the present invention is carried out without an external supply of steam being necessary.

The device for implementing the method according to the invention essentially comprises a vessel under reduced pressure with respect to atmospheric pressure, into which the foodstuffs are introduced and are heated by condensation of steam which comes from the bottom of the vessel and in which the foodstuffs move under gravity towards the bottom of the vessel whilst the steam moves in counter-flow with respect to the foodstuffs.

BRIEF DESCRIPTION OF THE FIGURES

The same reference numbers are used in the various figures to represent identical or similar elements.

DETAILED DESCRIPTION OF SEVERAL PREFERRED EMBODIMENTS OF THE INVENTION

Figure 1:
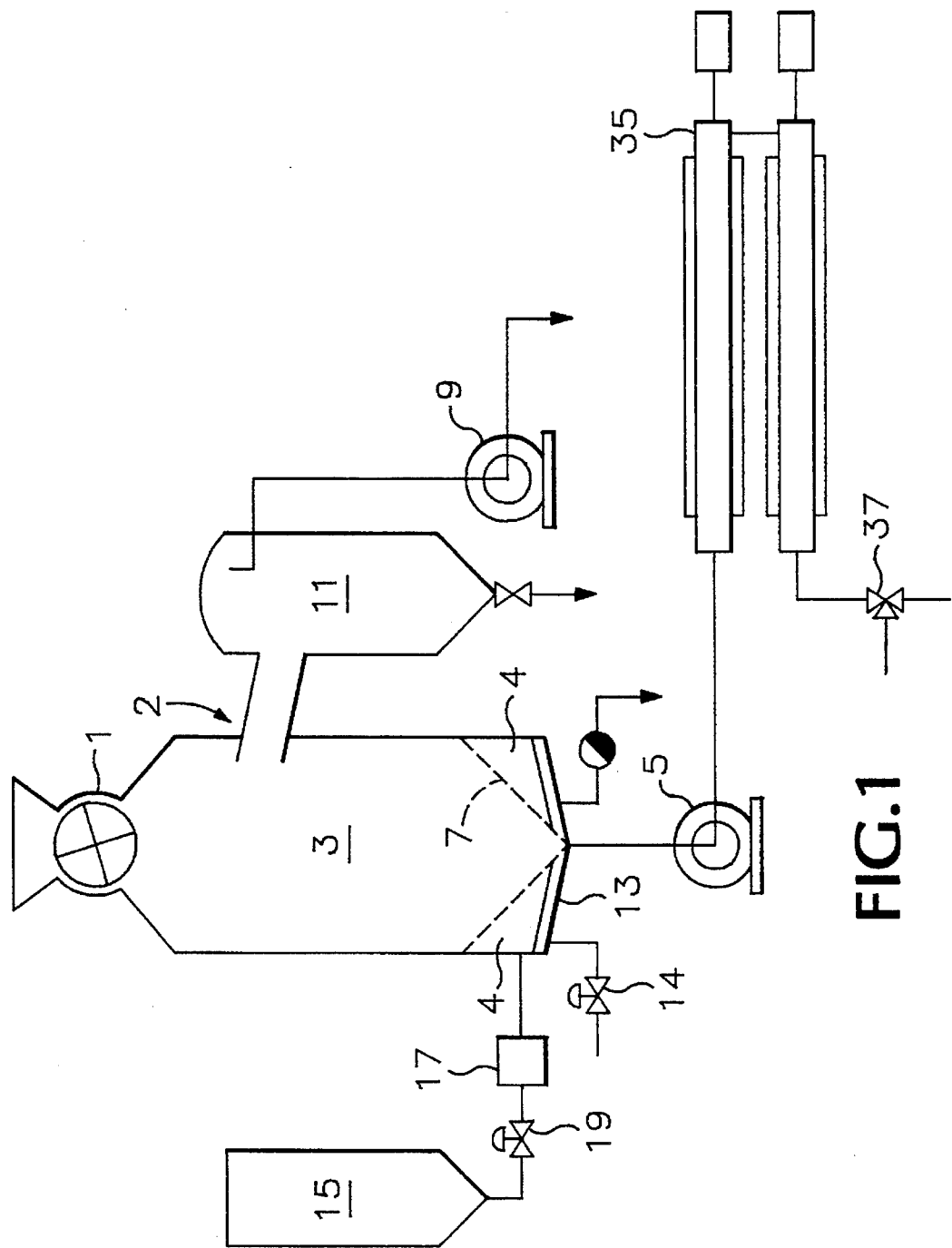
FIG. 1 represents a diagrammatic view of the device according to the invention, allowing implementation of the method.
Figure 2:
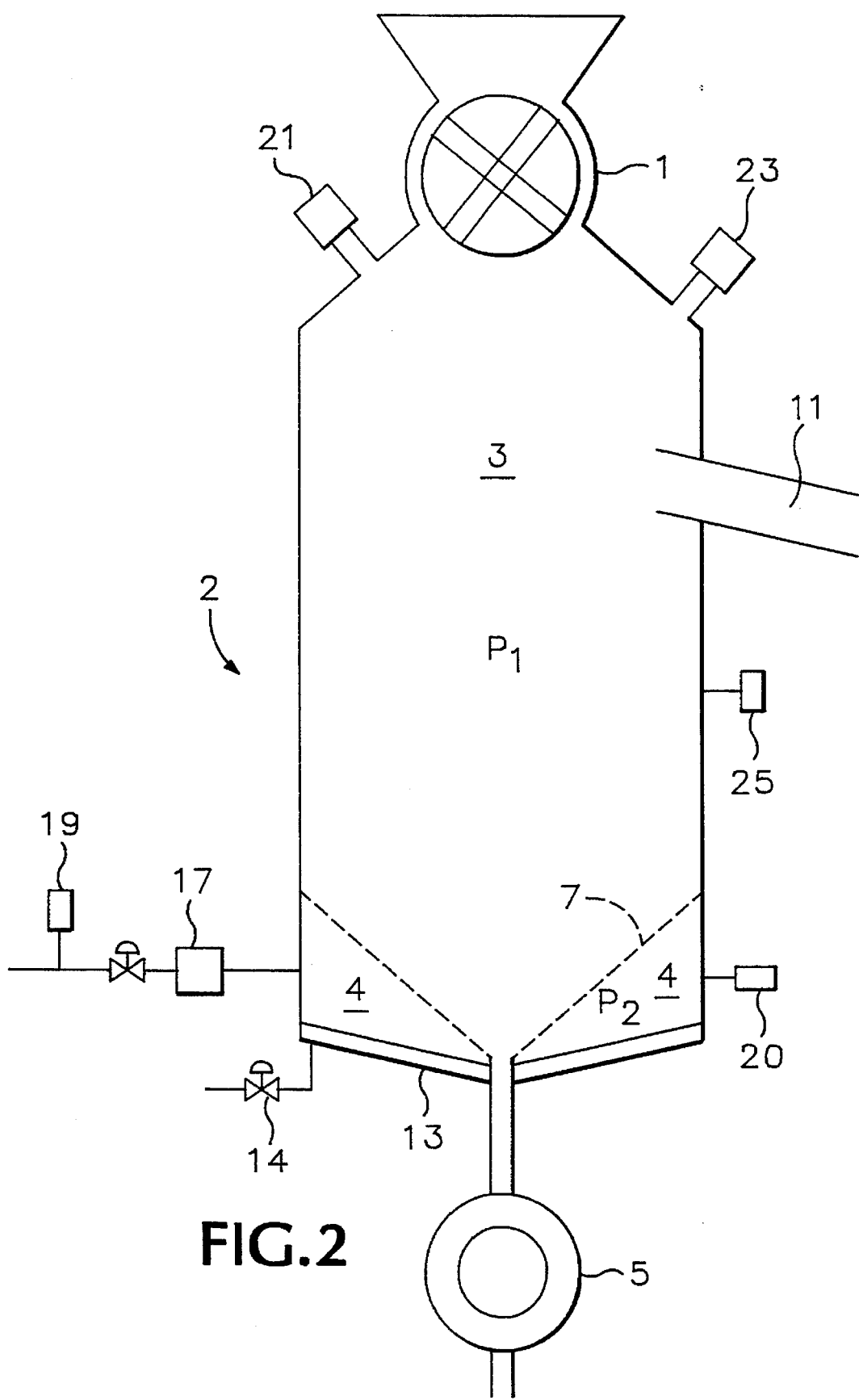
FIG. 2 represents a detailed view of the reduced pressure vessel according to FIG. 1.

As is shown by FIGS. 1 and 2, the foodstuffs, for example fruit, are introduced into a vessel which is under reduced pressure with respect to atmospheric pressure and given the general reference 2, via an airlock 1 which operates by compartmentalization.

In preference, this airlock 1 which is intended to introduce the foodstuffs into the vessel 2 is equipped with a variable-speed gear and a frequency converter which is coupled to a positive displacement pump 5 arranged at the exit of the vessel 2 and which removes the product therefrom.

The reduced-pressure vessel 2 is essentially composed of an upper chamber 3 and one or more lower housings 4 separated from the enclosure 3 by perforated grids 7.

The chamber 3 is connected via a condenser 11 to a vacuum pump 9.

This condenser 11 may operate in various modes. For example, the condensation may be obtained by preferably spraying droplets of water into the condenser, or a cold water pipeline is alternatively directly fitted to the condenser and connected to a vacuum pump, preferably a stainless steel ring water pump.

The operation of the airlock i necessarily brings air in through the airlock itself and consequently causes loss of pressure reduction. The pump must therefore be capable of continuously compensating for this pressure reduction loss so as to obtain a constant pressure $P_1$ (less than atmospheric pressure $P_a$) in the chamber 3 when the apparatus is operating.

The covering liquid coming from a tank 15 is introduced into the reduced-pressure vessel 2 via a flowmeter 17 which regulates the covering liquid supply using a differential-pressure valve 19.

More precisely, this covering liquid which is intended for filling the preserving containers (can or bag) during the covering liquid addition stage, is introduced into the housing or housings 4 arranged between the bottom of the vessel 2 and the perforated plates 7. This covering liquid is heated via a double wall 13 which is itself heated by circulation of steam coming from an external circuit 14.

Other heating means are obviously not precluded.

Consequently, in the housing or housings 4 bounded by the perforated plates 7, a pressure $P_2$ prevails which is greater than $P_1$ prevailing in the upper chamber 3, that is to say that the reduced pressure prevailing in the housing 4 is less strong than that in the chamber 3.

Because of this, there is a movement of steam which is constantly formed from the covering liquid coming from the housing 4 towards the upper chamber 3 through the perforated plates 7. This steam condenses upon contact with the foodstuff which is at a lower temperature, thus providing it with the heat supply necessary for pasteurizing the foodstuff.

Furthermore, foodstuffs which lie in the uppermost layers of the upper chamber 3 have the oxygen present in their tissues removed because of the reduced pressure $P_1$ prevailing in this chamber.

As the foodstuff descends in the reduced-pressure vessel 2, it is heated constantly, layer by layer, by condensation of steam.

At a determined level, the foodstuffs comes into contact with the covering liquid and is sucked up by the positive displacement pump 5 and then leaves the reduced-pressure vessel 2. This prevents a "floating" during the suction on the foodstuff with the covering liquid and perfect mixing of the pieces of foodstuff such as fruit with the covering liquid thereby is obtained.

The product is then pumped towards a scraped-surface exchanger 35 before reaching a "holding" treatment unit 37 where the sterilization is carried out and a cooling unit, not represented, before aseptic filling of, for example, bags.

Any other kind of heat exchanger can be used instead of a scraped-surface exchanger.

The device also comprises several sensors or detectors which are intended to monitor its operation.

In the upper part of the reduced-pressure vessel 2, an electronic pressure detector 23 has been arranged, together with a safety valve 21 which allows removal of the excess steam when an excessively high overpressure peak has been reached.

In preference, this detector 23 will directly control the supply of steam in the external circuit 14 which heats the double wall 13, this being as a function of data additionally supplied by a temperature detector 25.

It is also possible to provide a safety detector 20 which monitors the presence of covering liquid on the double wall 13.

Figure 3:
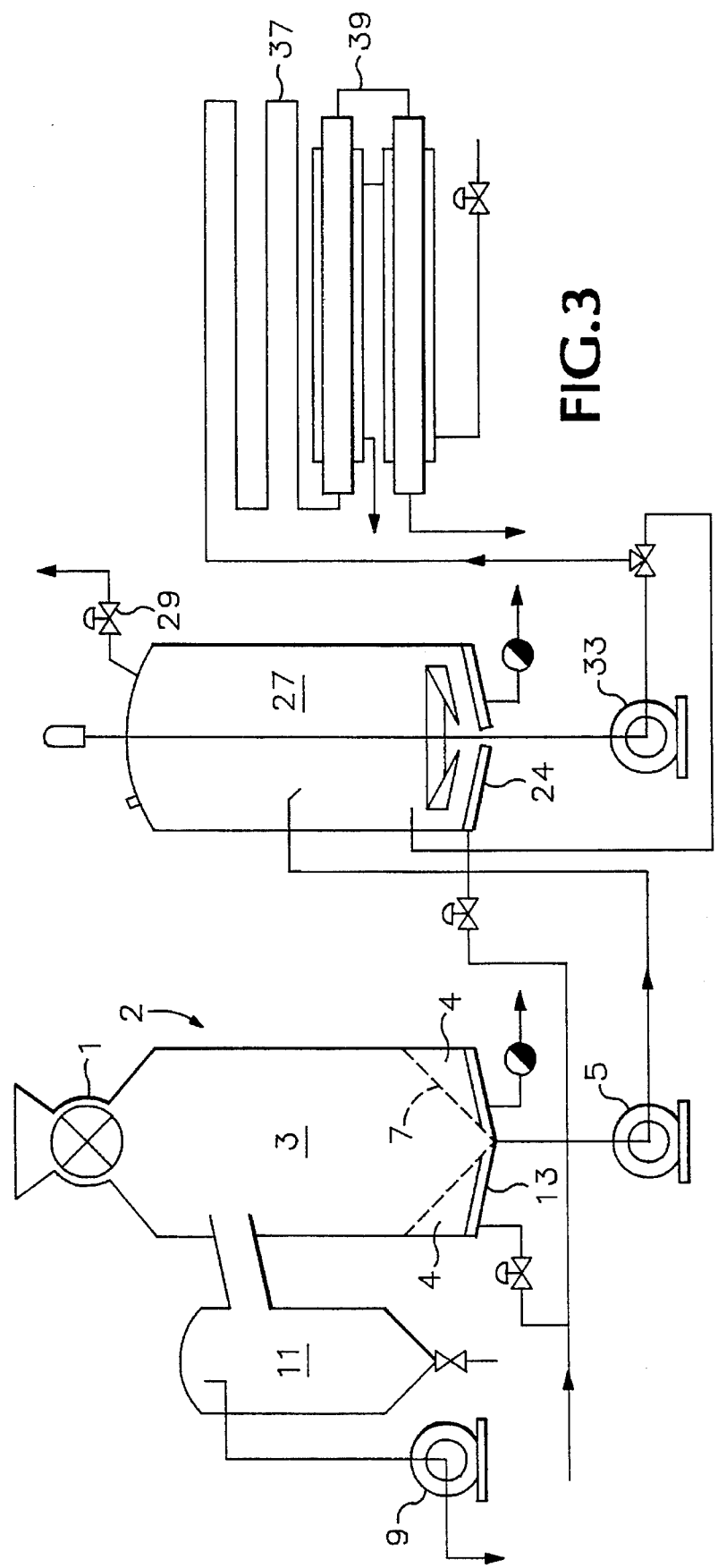
FIG. 3 represents a diagrammatic view of another preferred device of the invention, corresponding to an alternative embodiment of the method.
Figure 4:
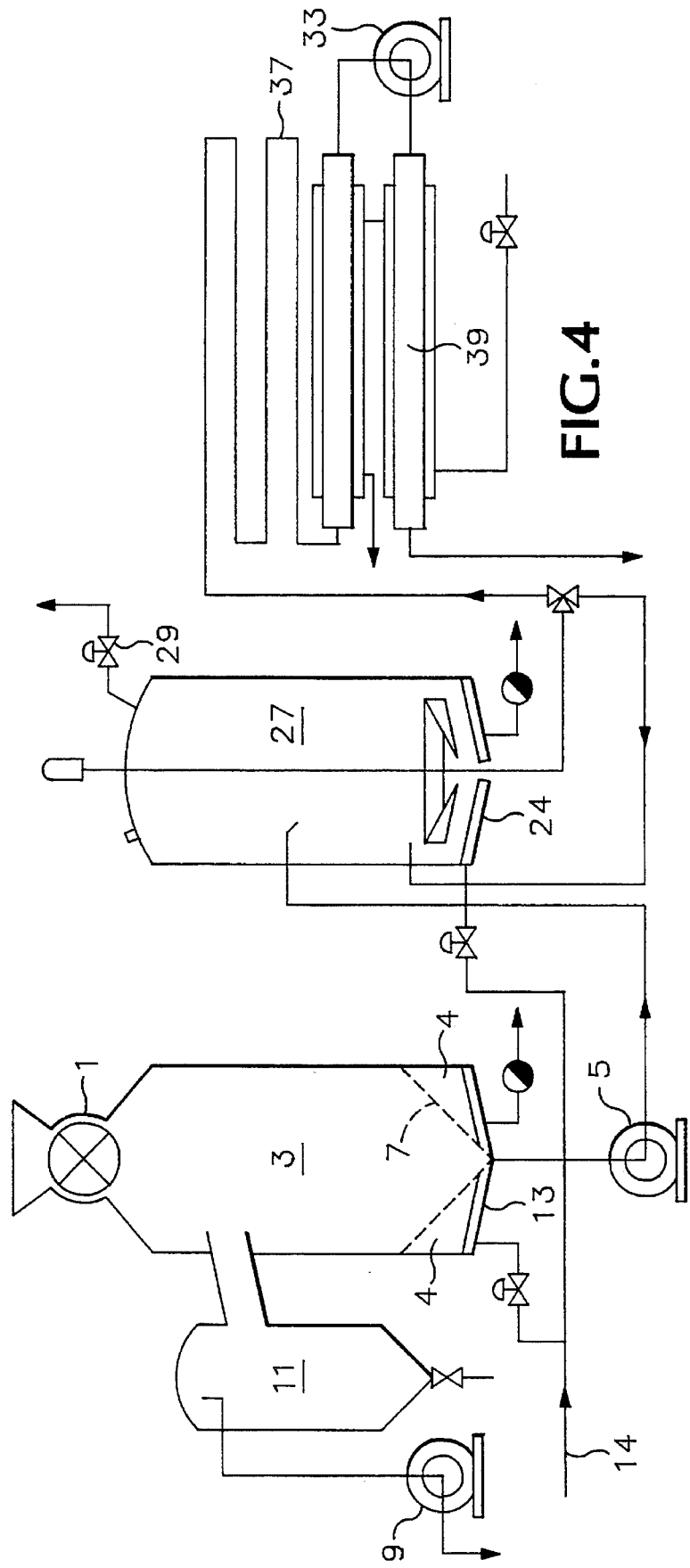
FIG. 4 represents a diagrammatic view of another preferred device of the invention, corresponding to another alternative embodiment of the method.

According to a second preferred embodiment of the present invention, foodstuffs having a pH greater than 4 such as meat, vegetables, fish, etc., can be treated in a device described in FIGS. 3 and 4.

In this case, the sterilization temperature is greater than 100° C., and, as represented in FIG. 3, the foodstuffs are sucked up upon leaving the reduced-pressure vessel 2 by a positive displacement pump 5 before being introduced into a second chamber 27 which is under pressure. The pressure in this chamber is higher in the lower part than in the upper part. This chamber is also heated by means of a double wall 24 which is itself heated using steam coming from the external circuit 14. Temperatures greater than 110° C. are easily achieved in this way.

The foodstuffs are then sucked up by a steam barrier pump 33 located below the pressurized chamber 27 and are conveyed to the treatment unit 37 and the cooling stage 39 before aseptic filling is carried out.

This arrangement is preferably used for foodstuffs which have a sterilization temperature lying between 100° and 115° C.

For foodstuffs requiring a higher temperature (greater than 115° C.), the pump 33 will preferably be placed between various cooling stages 39 and consequently at a location where the temperature has already decreased, for example reached about 100° C. (see FIG. 4).

The main advantage of this arrangement is that the product is no longer as decomposable and therefore vulnerable during the pumping by the pump 33. In this case, it should be noted that it is not necessary for the pump 33 to operate synchronously with the positve displacement pump 5.

I claim:

1. Method for preservation of bulk fresh foodstuffs by heat treatment, comprising:
    introducing the foodstuffs into a reduced-pressure chamber through an air lock thereby maintaining the reduced pressure in the chamber,
    moving the foodstuffs in a pre-defined direction of travel in the chamber,
    subjecting the foodstuffs in the chamber to a flow of steam wherein the steam flow is in a direction opposite the direction of travel of the foodstuffs, and
    providing some of the heat necessary for heating the foodstuffs by allowing steam to condense on the foodstuffs in the chamber.

2. Method according to claim 1, which includes generating the steam in the chamber without an external supply of steam, the steam being generated from the water released from the foodstuffs and from a covering liquid necessary for aseptic filling.

3. Method according to claim 1, characterized in that the steps of the method occur in a continuous cycle.

4. The method claim 1 wherein said moving the foodstuffs in a pre-defined direction of travel includes moving the foodstuff in a vertical direction of travel under the influence of gravity.

5. A device for preserving bulk fresh foodstuffs by heat treatment, comprising: a vessel (2) under reduced pressure with respect to atmospheric pressure, means for introducing the foodstuffs into said vessel, which vessel includes means for moving the foodstuffs in a pre-determined direction in said vessel and wherein the foodstuffs are heated by the condensation of a flow of steam moving in a direction opposite to the direction of movement of the foodstuffs, which further includes an airlock (1) which provides an entry for the foodstuffs into said vessel, and a positive displacement pump (5) located at the exit of said vessel (2), which removes the foodstuffs therefrom.

6. The device claim 5, wherein the reduced-pressure vessel includes an upper chamber (3) in which a constant pressure less than atmospheric pressure prevails and at least one lower housings (4) separated from said upper chamber (3) by perforated grids (7), in which a pressure ($P_2$) prevails which is greater than the pressure ($P_1$) prevailing in the upper chamber (3).

7. The device of claim 6, wherein said upper chamber (3) is connected to a vacuum pump (9) via a condenser (11).

8. The device of claim 6 which further includes a tank (15) for introducing covering liquid into said housing (4) which is located between the bottom of the vessel (2) and the perforated grids (7).

9. The device of claim 8, wherein the covering liquid is heated via a double wall (13) which is itself heated by a flow of steam coming from an external circuit (14).

10. The device of claims 5 which further includes sensors (20, 21, 23 and 29) which monitor the operation of the device.

11. The device of claim 5 which further includes a pressurized chamber (27) having a top portion and a bottom portion, wherein the pressure in the pressurized chamber (27) is higher in the top portion than in the bottom portion, and wherein said pressurized chamber (27) is connected to said reduced-pressure vessel (2) through said positive displacement pump (5), and wherein the foodstuffs are transported to said pressurized chamber (27).

12. The device of claim 11, which includes a second pump (33) which sucks the foodstuffs out of said pressurized chamber (27).

13. The device of claim 12 which further includes a cooling unit (35) having multiple stages therein, and wherein said second pump (33) is located between two of said multiple cooling stages of said cooling unit (35).

14. The device of claim 12, which further includes a cooling unit (35) and wherein said second pump (33) is located between said pressurized chamber (27) and said cooling unit (35).

* * * * *